(12) United States Patent
Wang et al.

(10) Patent No.: US 10,659,911 B1
(45) Date of Patent: May 19, 2020

(54) DEDUPLICATION OF POINTS OF INTEREST (POIS) FROM DIFFERENT SOURCES

(71) Applicant: INTERNATIONAL BUSINESS MACHINES CORPORATION, Armonk, NY (US)

(72) Inventors: Zhi Hu Wang, Beijing (CN); Li Zhang, Beijing (CN); Shiwan Zhao, Beijing (CN); Changhua Sun, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/172,251

(22) Filed: Oct. 26, 2018

(51) Int. Cl.
| | |
|---|---|
| *H04W 4/021* | (2018.01) |
| *G06F 16/29* | (2019.01) |
| *G06F 16/907* | (2019.01) |
| *G06F 17/18* | (2006.01) |
| *H04W 4/02* | (2018.01) |

(52) U.S. Cl.
CPC ............ *H04W 4/021* (2013.01); *G06F 16/29* (2019.01); *G06F 16/907* (2019.01); *G06F 17/18* (2013.01); *H04W 4/025* (2013.01)

(58) Field of Classification Search
CPC ....... H04W 4/021; H04W 4/025; G06F 16/29; G06F 16/907; G06F 17/18
See application file for complete search history.

(56) References Cited

U.S. PATENT DOCUMENTS

| 9,176,983 | B2 | 11/2015 | Hiestermann et al. |
| 9,811,559 | B2 | 11/2017 | Spehr et al. |
| 9,904,709 | B2 | 2/2018 | Krumm et al. |
| 2012/0066240 | A1* | 3/2012 | Morimoto ............... G06F 16/29 707/758 |

(Continued)

FOREIGN PATENT DOCUMENTS

JP 5218894 B2 6/2013

OTHER PUBLICATIONS

Lamprianidis, George et al. "Extraction, integration and analysis of crowdsourced points of interest from multiple web sources," Proceedings of the 3rd ACM SIGSPATIAL International Workshop on Crowdsourced and Volunteered Geographic Information. ACM, Nov. 2014, pp. 16-23.

(Continued)

*Primary Examiner* — Minjung Kim
(74) *Attorney, Agent, or Firm* — Tutunjian & Bitetto, P.C.; Joseph Petrokaitis

(57) ABSTRACT

Methods, systems, and computer program products relate to deduplication of points of interest (POIs) from different sources. In some embodiments, a method is disclosed. According to the method, a first set of POIs are obtained from a first source and a second set of POIs are obtained from a second source. The first set of POIs are divided into a plurality of groups of POIs including a first group of POIs. A second group of POIs to be matched with the first group of POIs are determined from the second set of POIs. Duplicated POIs are identified from the first and second sets (Continued)

of POIs by matching the first group of POIs and the second group of POIs. In other embodiments, a system and a computer program product are disclosed.

20 Claims, 10 Drawing Sheets

(56) References Cited

U.S. PATENT DOCUMENTS

| | | | |
|---|---|---|---|
| 2015/0052149 A1* | 2/2015 | Hiestermann | G01C 21/32 |
| | | | 707/743 |
| 2017/0199905 A1 | 7/2017 | Ott et al. | |
| 2018/0137204 A1* | 5/2018 | Zhang | H04W 4/021 |
| 2018/0306600 A1* | 10/2018 | Nicolaas | G01C 21/3679 |

OTHER PUBLICATIONS

De Tre, Guy et al. "Automated cleansing of POI databases," Quality Issues in the Management of Web Information, 2013, 38 pages, Springer, Berlin, Heidelberg.

Matuszka, Tamas. "The design and implementation of semantic web-based architecture for augmented reality browser," European Semantic Web Conference, May 2015, pp. 731-739, Springer, Cham.

* cited by examiner

FIG. 12

| MAPPING INDEX | MATCHING RELATIONSHIP | PROBABILITY |
|---|---|---|
| 1210-1 | POI_1_1 = POI_2_1<br>POI_1_2 = POI_2_2<br>POI_1_3 = POI_2_3<br>POI_1_4 = POI_2_4 | 0.2+0.01+0.01+0.74 = 0.96 |
| 1210-2 | POI_1_1 = POI_2_1<br>POI_1_2 = POI_2_2<br>POI_1_3 = POI_2_4<br>POI_1_4 = POI_2_3 | 0.2+0.01+0.08+0.01=0.3 |
| 1210-3 | POI_1_1 = POI_2_1<br>POI_1_2 = POI_2_3<br>POI_1_3 = POI_2_2<br>POI_1_4 = POI_2_4 | 0.2+0.67+0.08+0.74=1.69 |
| 1210-4 | POI_1_1 = POI_2_1<br>POI_1_2 = POI_2_3<br>POI_1_3 = POI_2_4<br>POI_1_4 = POI_2_2 | 0.2+0.67+0.08+0.76=1.71 |
| 1210-5 | POI_1_1 = POI_2_1<br>POI_1_2 = POI_2_4<br>POI_1_3 = POI_2_2<br>POI_1_4 = POI_2_3 | 0.2+0.03+0.08+0.01=0.32 |
| 1210-6 | POI_1_1 = POI_2_1<br>POI_1_2 = POI_2_4<br>POI_1_3 = POI_2_3<br>POI_1_4 = POI_2_2 | 0.2+0.03+0.75+0.76=1.74 |
| 1210-7 | POI_1_1 = POI_2_2<br>POI_1_2 = POI_2_1<br>POI_1_3 = POI_2_3<br>POI_1_4 = POI_2_4 | 0.69+0.12+0.01+0.74=1.56 |
| 1210-8 | POI_1_1 = POI_2_2<br>POI_1_2 = POI_2_1<br>POI_1_3 = POI_2_4<br>POI_1_4 = POI_2_3 | 0.69+0.12+0.08+0.01=0.9 |
| 1210-9 | POI_1_1 = POI_2_2<br>POI_1_2 = POI_2_3<br>POI_1_3 = POI_2_1<br>POI_1_4 = POI_2_4 | 0.69+0.67+0.75+0.74=2.85 |
| 1210-10 | POI_1_1 = POI_2_2<br>POI_1_2 = POI_2_3<br>POI_1_3 = POI_2_4<br>POI_1_4 = POI_2_1 | 0.69+0.67+0.08+0.17=1.61 |
| ... | ... | ... |

1200

DEDUPLICATION OF POINTS OF INTEREST (POIS) FROM DIFFERENT SOURCES

BACKGROUND

Technical Field

The present disclosure generally relates to deduplication of points of interest (POIs), and more specifically, to methods, systems, and computer program products for deduplication of POIs from different sources.

Description of the Related Art

POIs refer to geographic locations which might be of interest for some users, such as public transport facilities, hotels, restaurants, gas stations, hospitals and so on. Typically, information about POIs can be gathered by surveyors using sophisticated surveying instruments. Since information gathering with respect to POIs is resource consuming, a service provider may usually obtain information about POIs from different sources and integrate the POI information originating from different sources for use. However, the POI information from different sources may have different data precision. For example, different POIs describing the same physical geographic location might exist, and thus need to be deduplicated

SUMMARY

In a first aspect, embodiments of the present disclosure provide a method. According to the method, a first set of POIs are obtained from a first source and a second set of POIs are obtained from a second source. The first set of POIs are divided into a plurality of groups of POIs including a first group of POIs. A second group of POIs to be matched with the first group of POIs are determined from the second set of POIs. Duplicated POIs are identified from the first and second sets of POIs by matching the first group of POIs and the second group of POIs.

In a second aspect, embodiments of the present disclosure provide a system. The system includes a processing unit and a memory coupled to the processing unit. The memory stores instructions that, when executed by the processing unit, perform actions comprising: obtaining a first set of points of interest (POIs) from a first source and a second set of POIs from a second source; dividing the first set of POIs into a plurality of groups of POIs, the plurality of groups of POIs including a first group of POIs; determining, from the second set of POIs, a second group of POIs to be matched with the first group of POIs; and identifying duplicated POIs from the first and second sets of POIs by matching the first group of POIs and the second group of POIs.

In a third aspect, embodiments of the present disclosure provide a computer program product. The computer program product is tangibly stored on non-transient machine-readable medium and includes machine-executable instructions. The machine-executable instructions, when executed on a device, cause the device to perform acts including: obtaining a first set of points of interest (POIs) from a first source and a second set of POIs from a second source; dividing the first set of POIs into a plurality of groups of POIs, the plurality of groups of POIs including a first group of POIs; determining, from the second set of POIs, a second group of POIs to be matched with the first group of POIs; and identifying duplicated POIs from the first and second sets of POIs by matching the first group of POIs and the second group of POIs.

It is to be understood that the summary is not intended to identify key or essential features of embodiments of the present invention, nor is it intended to be used to limit the scope of the present embodiment. Other features of the present embodiment will become easily comprehensible through the description below.

BRIEF DESCRIPTION OF THE DRAWINGS

Through the more detailed description of some embodiments of the present embodiment in the accompanying drawings, the above and other objects, features and advantages of the present embodiment will become more apparent.

FIG. 12 depicts an example diagram of a plurality of mappings between the first group of POIs and the second group of POIs according to embodiments of the present invention.

Throughout the drawings, same or similar reference numerals represent the same or similar elements.

DETAILED DESCRIPTION

Figure 1:
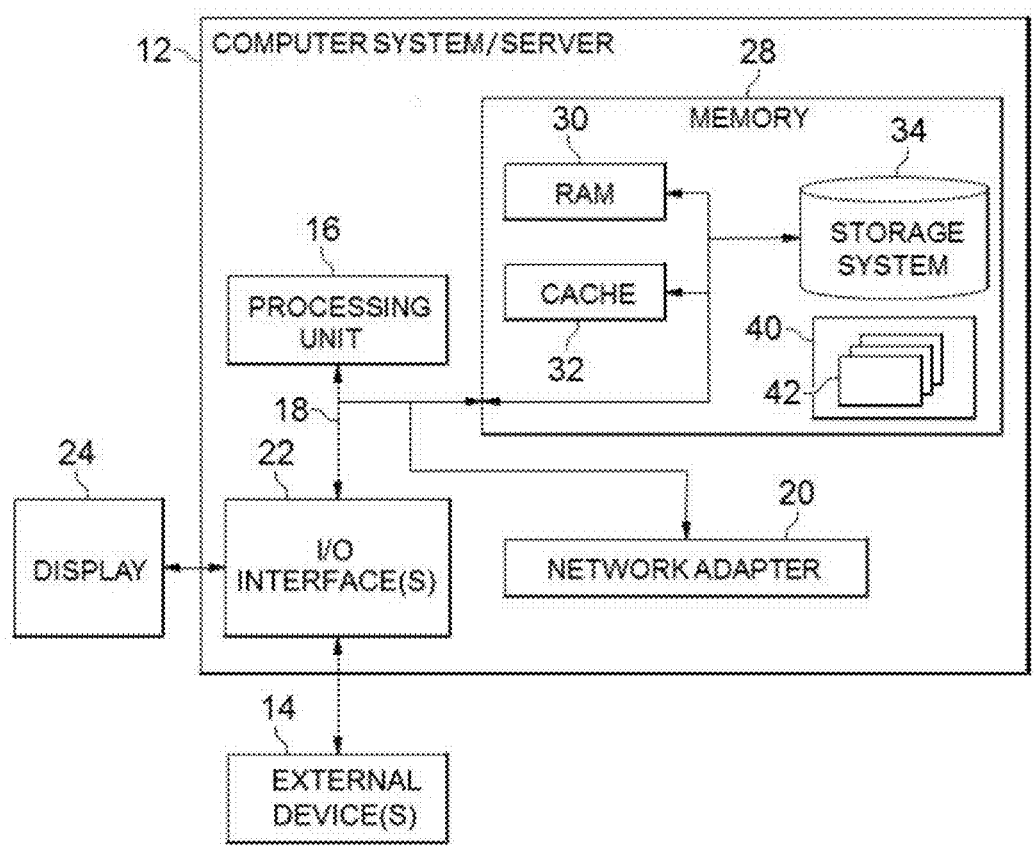
FIG. 1 depicts a cloud computing node according to an embodiment of the present invention.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
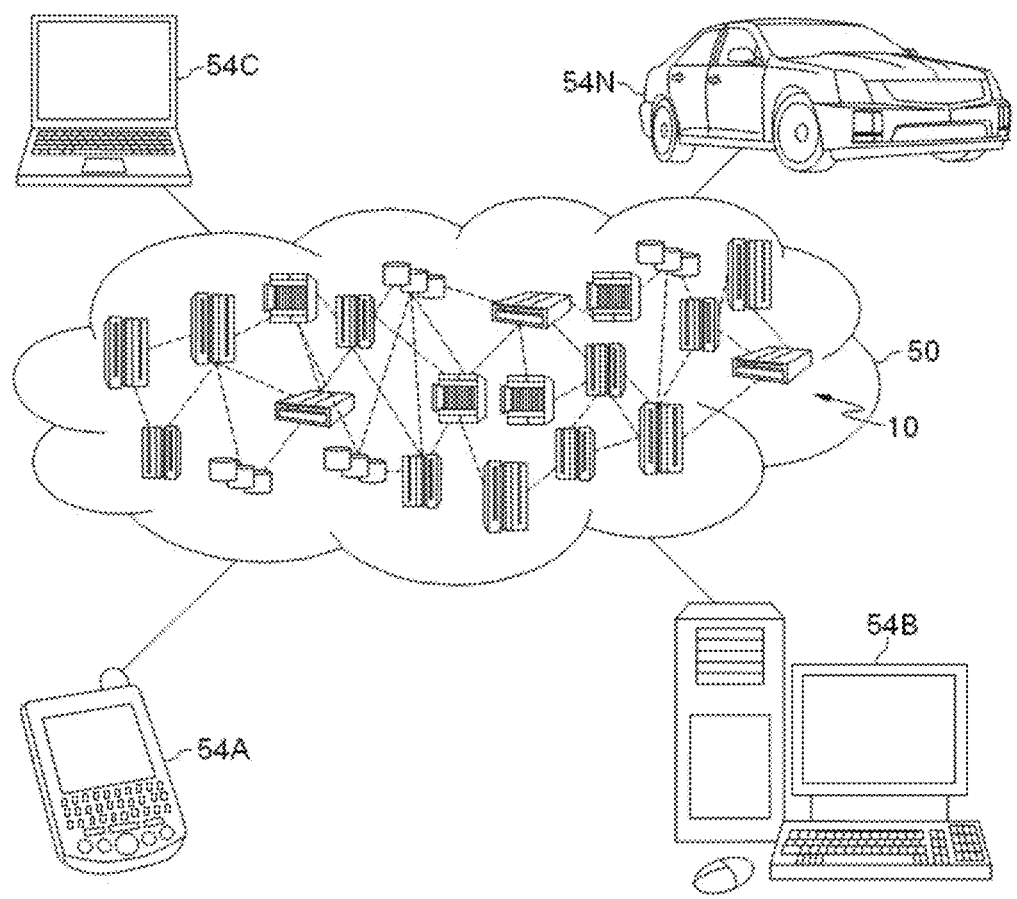
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
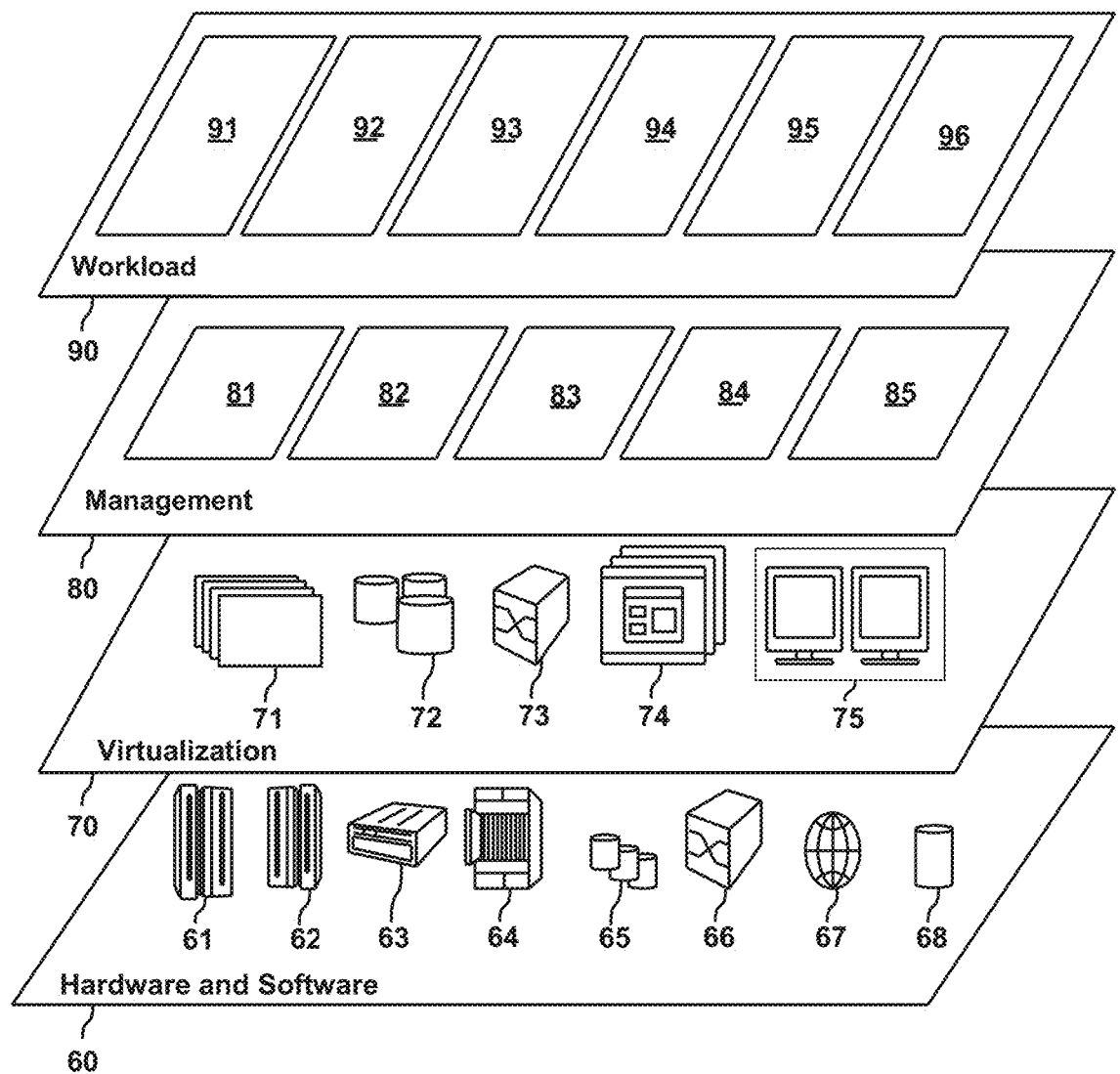
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and deduplication processing 96. Hereinafter, reference will be made to FIG. 4 to FIG. 12 to describe details of the deduplication processing 96.

Figure 4:
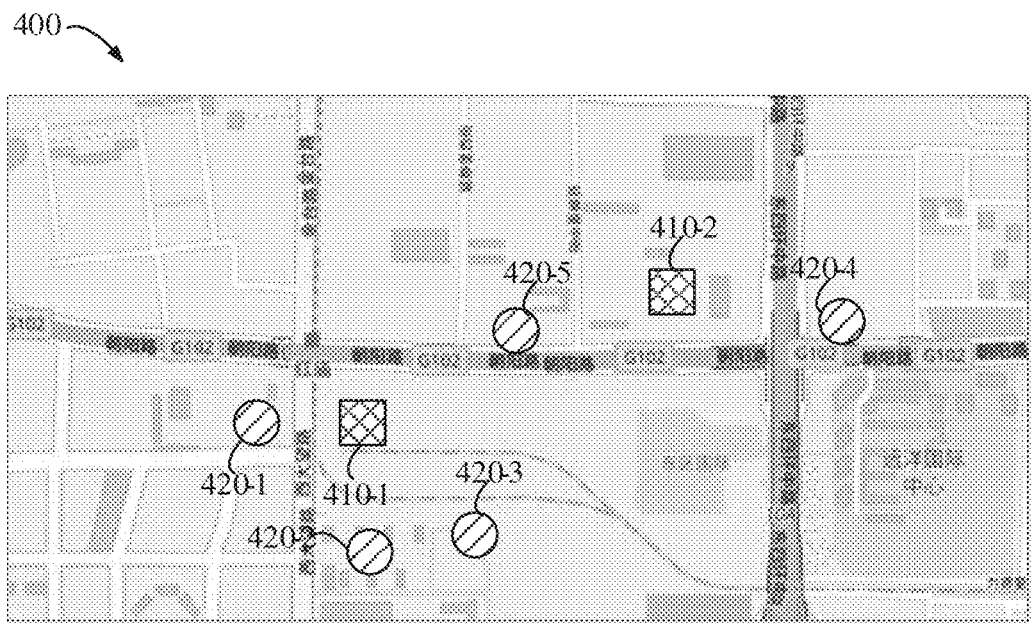
FIG. 4 depicts an example diagram of POIs from two different sources according to embodiments of the present invention.

As described above, a service provider or POI integration provider may capture POIs from different sources, which might include duplicated POIs. FIG. 4 depicts an example diagram 400 of POIs from two different sources according to some embodiments of the present invention. In FIG. 4, POIs from two different sources are projected and displayed on a same map for the purpose of explanation. As shown in FIG. 4, a first set of POIs 410-1 and 410-2 (collectively referred to as POIs 410) may be obtained from a first source. A second set of POIs 420-1, 420-2 . . . 420-5 (collectively referred to as POIs 420) may be obtained from a second source, which is different from the first source. The POI information obtained from the first and second sources may have different data precision, and thus there may be duplicated POIs in the first and second sets of POIs. For example, in FIG. 4, although the POI 420-1 from the second source and the POI 410-1 from the first source are separated by a street, they might refer to a same physical geographic location, such as, a big park or parking lot. Such duplicated POIs should be avoided as they could harm the data quality and integrity.

Traditionally, duplicated POIs from different sources can be identified by comparing their respective features, such as, locations, names, addresses, types and business hours. For example, in the example as shown in FIG. 4, duplicated POIs can be identified by comparing features of each of the first set of POIs 410 with features of each of the second set of POIs 420, and then deduplicated. However, in some cases, the number of POIs from different sources may be huge, and thus the above solution might be inefficient and time consuming.

In order to at least partially solve the above and other potential problems, embodiments of the present invention provide a new solution for deduplicating POIs from different sources. The solution splits the global POI matching among different sources into multiple parallel groups, so as to narrow the search space for duplicated POIs. In this way, the solution can greatly improve the efficiency of POI deduplication, and reduce the computing overhead thereof.

Figure 5:
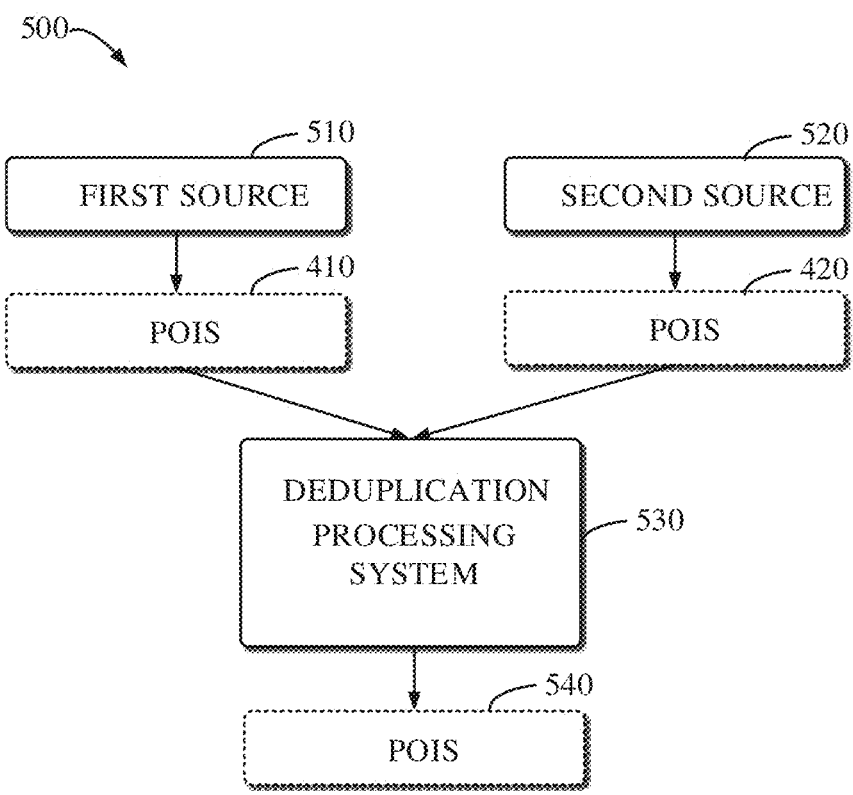
FIG. 5 depicts an example environment in which embodiments of the present invention may be implemented.

FIG. 5 depicts an example environment 500 in which embodiments of the present invention can be implemented. As shown in FIG. 5, the environment 500 includes a deduplication processing system 530. For example, the deduplication processing system 530 could be implemented by computer system/server 12 of FIG. 1. In some embodiments, the deduplication processing system 530 may obtain the first set of POIs 410 from a first source 510 and obtain the second set of POIs 420 from a second source 520. In some embodiments, the first source 510 and the second source 520 may be different. For example, the first source may be a specialized POI provider, which may provide a small number of POIs with relatively high precision. The second source may be a common POI provider (for example, an online ordering website), which may provide a large number of POIs with relatively low precision. Although two sources are shown in the environment 500, it is to be understood that this is merely for the purpose of illustration, without suggesting any limitation to the present invention. Embodiments of the present invention can be applied to another environment with more than two sources.

In some embodiments, the deduplication processing system 530 may divide the first set of POIs 410 from the first source into a plurality of groups. For each of the plurality of groups divided from the first set of POIs 410, the deduplication processing system 530 may determine, from the second set of POIs 420, a respective group of POIs to be matched with the first group of POIs. Then, the deduplication processing system 530 may match each of the plurality of groups divided from the first set of POIs 410 and a respective group of POIs from the second set of POIs 420 to identify duplicated POIs. The deduplication processing system 530 may integrate the first set of POIs and the second set of POIs into a third set of POIs 540. For example, if it is determined that a first POI in the first set of POIs 410 matches a second POI in the second set of POIs 420, the deduplication processing system 530 may cause the third set of POIs 540 to include one of the first and second POIs.

Figure 6:
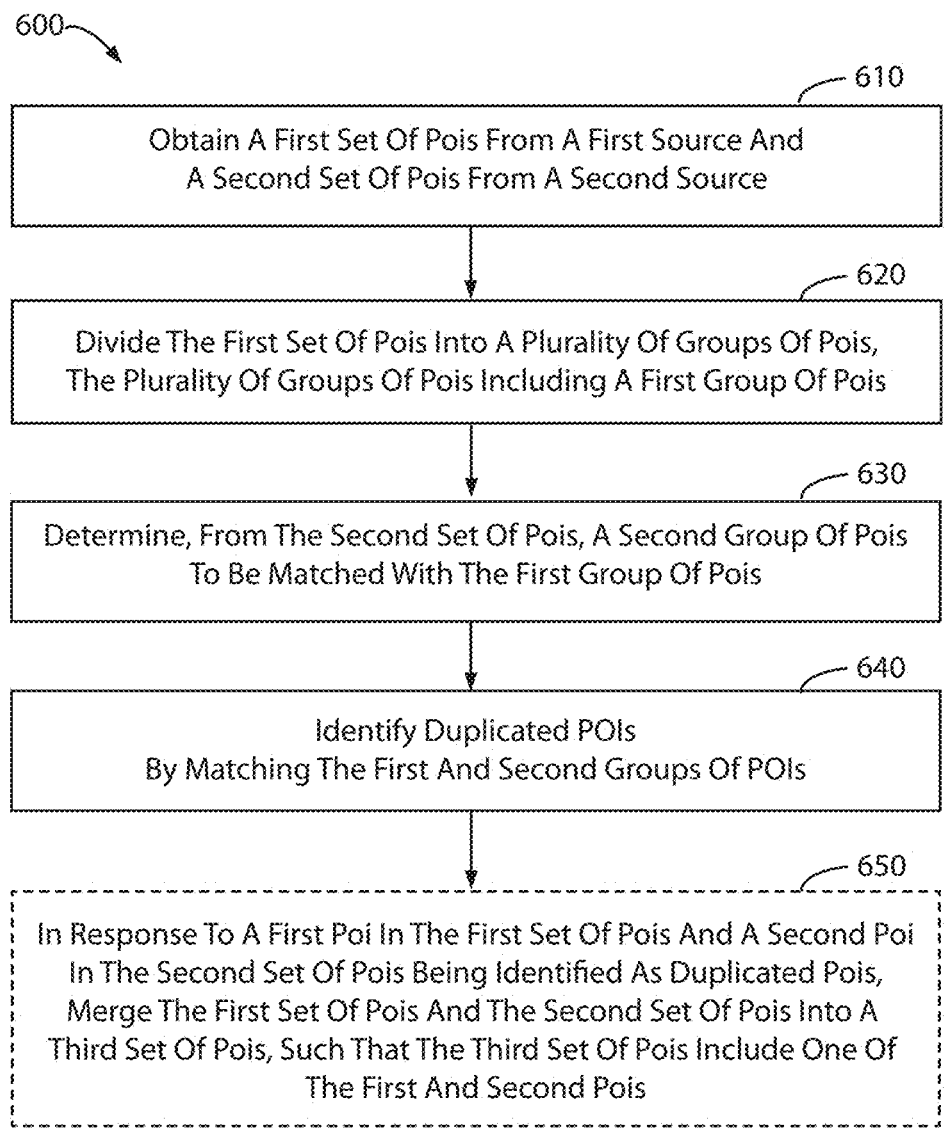
FIG. 6 depicts an example flowchart of a method for deduplicating POIs from different sources according to embodiments of the present invention.

FIG. 6 depicts an example flowchart of a method 600 for deduplicating POIs from different sources according to some embodiments of the present invention. The method 600 will be described in connection with the environment 500 shown in FIG. 5. For example, the method 600 may be performed by the deduplication processing system 530. It is to be understood that the method 600 may include additional blocks not shown and/or may omit some blocks as shown, and the scope of the present invention is not limited in this regard.

At block 610, the deduplication processing system 530 obtains a first set of POIs from a first source and a second set of POIs from a second source. In some embodiments, the first set of POIs and the second set of POIs may be located in a same geographic area, such as, a city, a certain district in a city or any other geographic area. Alternatively, in some embodiments, the first set of POIs may be located in a first geographic area and the second set of POIs may be located in a second geographic area that is overlapped with the first geographic area. Alternatively, in other embodiments, the first geographic area where the first set of POIs are located and the second geographic area where the second set of POIs are located may be separated from each other, but a distance between the two geographic areas (such as, the minimum distance between respective boundaries of the two geographic areas) may not exceed a predetermined threshold.

In some embodiments, the deduplication processing system 530 may obtain first information on the first set of POIs 410 from the first source 510. For example, the first information may describe features of the first set of POIs 410. In some embodiments, the features of a POI may include at least one of the following: spatial features, such as latitude, longitude and the like; text features, such as name, address and the like; and/or additional features, such as POI type (e.g., park, hotel, restaurant, gas station, hospital, over ground or underground, and the like), business hour and so on. In some embodiments, the first source 510 may be a specialized POI provider, which may provide a small number of POIs with relatively high precision. Additionally, the deduplication processing system 530 may obtain second information on the second set of POIs 420 from the second source 520. For example, the second information may describe features of the second set of POIs 420, including spatial features like latitudes and longitudes, text features like names and addresses, and additional features such as POI types, business hours and so on. In some embodiments, the second source 520 may be a common POI provider (such as an online order website), which may provide a large number of POIs with relatively low precision.

At block 620, the deduplication processing system 530 divides the first set of POIs into a plurality of groups of POIs. In some embodiments, the deduplication processing system 530 may compare the first number of POIs in the first set of POIs with the second number of POIs in the second set of POIs. In response to the first number being below the second number, the deduplication processing system 530 may divide the first set of POIs into a plurality of groups. Alternatively, or in addition, in some embodiments, in order to divide the first set of POIs into a plurality of groups, the deduplication processing system 530 may divide the geographic area where the first set of POIs are located into a plurality of sub-areas. Then, the deduplication processing system 530 may select POIs located in one of the plurality of sub-areas into a corresponding one of the plurality of groups of POIs.

Each of the plurality of sub-areas may correspond to a respective search space for duplicated POIs. Therefore, it is desired that each sub-area can have a suitable size. If the sub-area is too large, the corresponding search space may involve too many POIs, and thus the searching for duplicated POIs in this search space could be inefficient and time consuming. If the sub-area is too small, the corresponding search space may not involve enough POIs to identify duplicated POIs.

In some embodiments, the deduplication processing system 530 may divide the geographic area into a plurality of sub-areas based on a spatial distribution of the first set of POIs in the geographic area. Alternatively, or in addition, in some embodiments, the deduplication processing system 530 may divide the geographic area into a plurality of sub-areas based on types of the first set of POIs. For example, a park may usually involve a larger area than a gas station, and thus a sub-area including the park may be larger than another sub-area including the gas station. Alternatively, or in addition, in some embodiments, the deduplication processing system 530 may divide the geographic area into a plurality of sub-areas based on a predetermined range of sub-area sizes. For example, the radius of each sub-area should be within a scope of 2-5 kilometers. Further, the plurality of sub-areas may have a same size or different sizes, and/or have a same shape or different shapes. In this way, suitable search spaces for duplicated POIs can be achieved.

At block 630, the deduplication processing system 530 determines, from the second set of POIs 420, a group of POIs (also referred to as second group of POIs in the following) to be matched with one of the plurality of groups (also referred to as first group of POIs in the following) divided from the first set of POIs 410. For example, the first group of POIs may be located in a first sub-area from the plurality of sub-areas divided from the geographic area. In some embodiments, the deduplication processing system 530 may select, from the second set of POIs 420, the second group of POIs based on the first sub-area.

Figure 7:
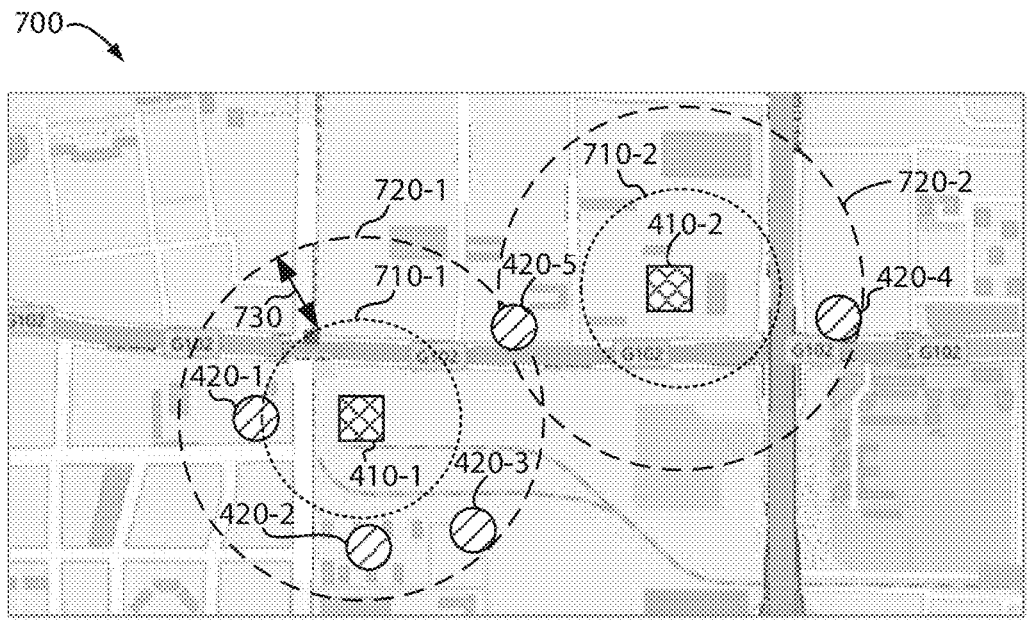
FIG. 7 depicts an example diagram for determining a second group of POIs from the second source to be matched with a first group of POIs from the first source according to embodiments of the present invention.

FIG. 7 depicts an example diagram 700 for determining a group of POIs from the second set of POIs to be matched with a corresponding group of POIs from the first set of POIs according to some embodiments of the present invention. As shown in FIG. 7, the first set of POIs 410 is divided into two groups by the deduplication processing system 530. One group includes the POI 410-1 located in a sub-area 710-1 and another group includes the POI 410-2 located in a sub-area 710-2. Although the sub-areas 710-1 and 710-2 are both shown as circular, it is to be understood that this is merely for the purpose of illustration, without suggesting any limitations to the present invention. In some embodiments, the sub-areas divided from the geometrical area can be of any shape, such as rectangular or irregular shape. In the following description, only for the purpose of explanation, the group including the POI 410-1 will be taken as an example of the first group of POIs, and the sub-area 710-1 will be taken as an example of the first sub-area.

In some embodiments, in order to determine a group of POIs (that is, the second group of POIs) from the second set of POIs 420 to be matched with the first group of POIs located in the sub-area 710-1, the deduplication processing system 530 may determine a distance from a POI in the second set of POIs 420 to the first sub-area 710-1. If the distance is below a predetermined threshold, the deduplication processing system 530 may select this POI into the second group of POIs. This predetermined threshold actually defines a fault-tolerant buffer extended from the boundary of the first sub-area, which is shown by 730 in FIG. 7. That is, the deduplication processing system 530 can determine, based on the sub-area 710-1 and the predetermined threshold 730, a sub-area 720-1 where the second group of POIs may be located. In this way, the global POI matching among different sources can be split into multiple groups, so as to narrow the search space for duplicated POIs. In this way, the efficiency for searching duplicated POIs can be increased. As shown in FIG. 7, the second group of POIs to be matched with the POI 410-1 may include the POIs 420-1, 420-2, 420-3 and 420-5. Likewise, the deduplication processing system 530 may further determine the POIs 420-4 and 420-5 located in the sub-area 720-2 to be matched with the POI 410-2.

With reference back to FIG. 6, the method 600 proceeds to block 640, where the deduplication processing system 530 identifies duplicated POIs from the first set of POIs 410 and the second set of POIs 420 by matching the first group of POIs and the second group of POIs. In some embodiments, the deduplication processing system 530 may match the first group of POIs and the second group of POIs to determine duplicated POIs. For example, if it is determined that a first POI from the first group of POIs matches a second POI from the second group of POIs, the deduplication processing system 530 may identify the first and second POIs as duplicated POIs.

In some embodiments, the deduplication processing system 530 may determine a similarity between each of the first group of POIs and each of the second group of POIs. The determined similarities between the first group of POIs and the second group of POIs can be used to identify duplicated POIs.

Figure 8:
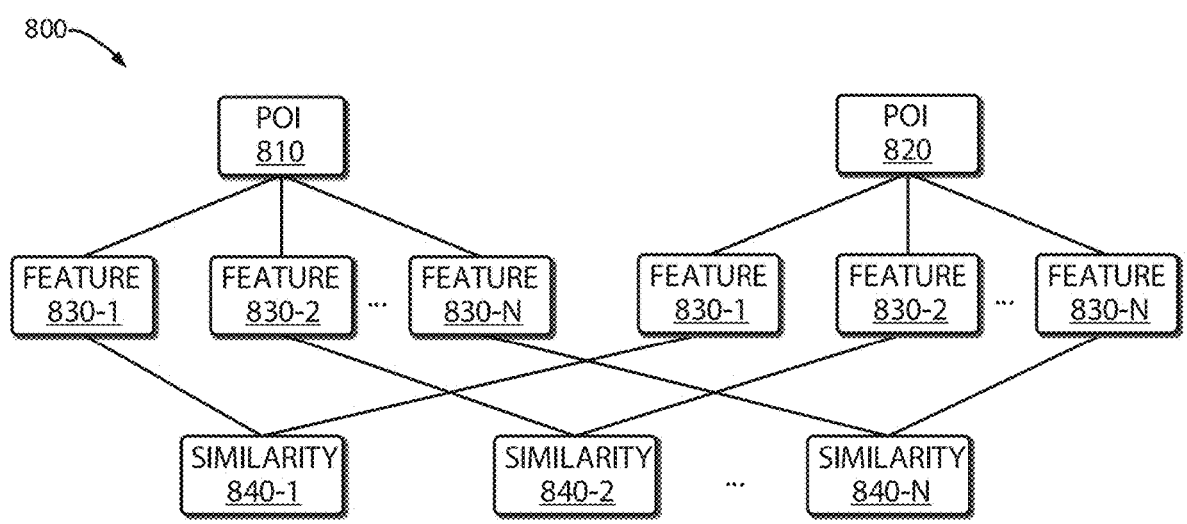
FIG. 8 depicts an example diagram for determining a similarity between two POIs according to embodiments of the present invention.

FIG. 8 depicts an example diagram 800 for determining a similarity between two POIs according to some embodiments of the present invention. Two POIs 810 and 820 are shown in FIG. 8. For example, the POI 810 may come from the first group of POIs, and the POI 820 may come from the second group of POIs. As shown in FIG. 8, each of the POIs 810 and 820 may be associated with a group of features 830-1, 830-2 ... 830-N (individually referred to as feature 830 or collectively referred to as features 830, where N is a nature number). Each of the features 830 may be one of the following: spatial feature (such as, latitude and longitude), text feature (such as, name, address or the like) or any other feature.

In some embodiments, the deduplication processing system 530 may determine a similarity 840-1 between the feature 830-1 of the POI 810 and that of the POI 820, a similarity 840-2 between the feature 830-2 of the POI 810 and that of the POI 820, . . . and a similarity 840-N between the feature 830-N of the POI 810 and that of the POI 820, respectively. For example, the feature 830-1 may represent a spatial feature, such as a position represented by latitude and longitude. In some embodiments, the deduplication processing system 530 may determine the similarity 840-1 by determining an Euclid distance between positions of the POI 810 and the POI 820. For example, the feature 830-2 may represent a text feature, such as name or address represented by a text string. In some embodiments, the deduplication processing system 530 may utilize semantic analysis to determine the similarity 840-2. Hereafter, reference will be made to FIG. 9 to explain details about how to determine the similarity between two text features. Only for the purpose of explanation, in FIG. 9, POI address will be taken as an example of the text feature.

Figure 9:
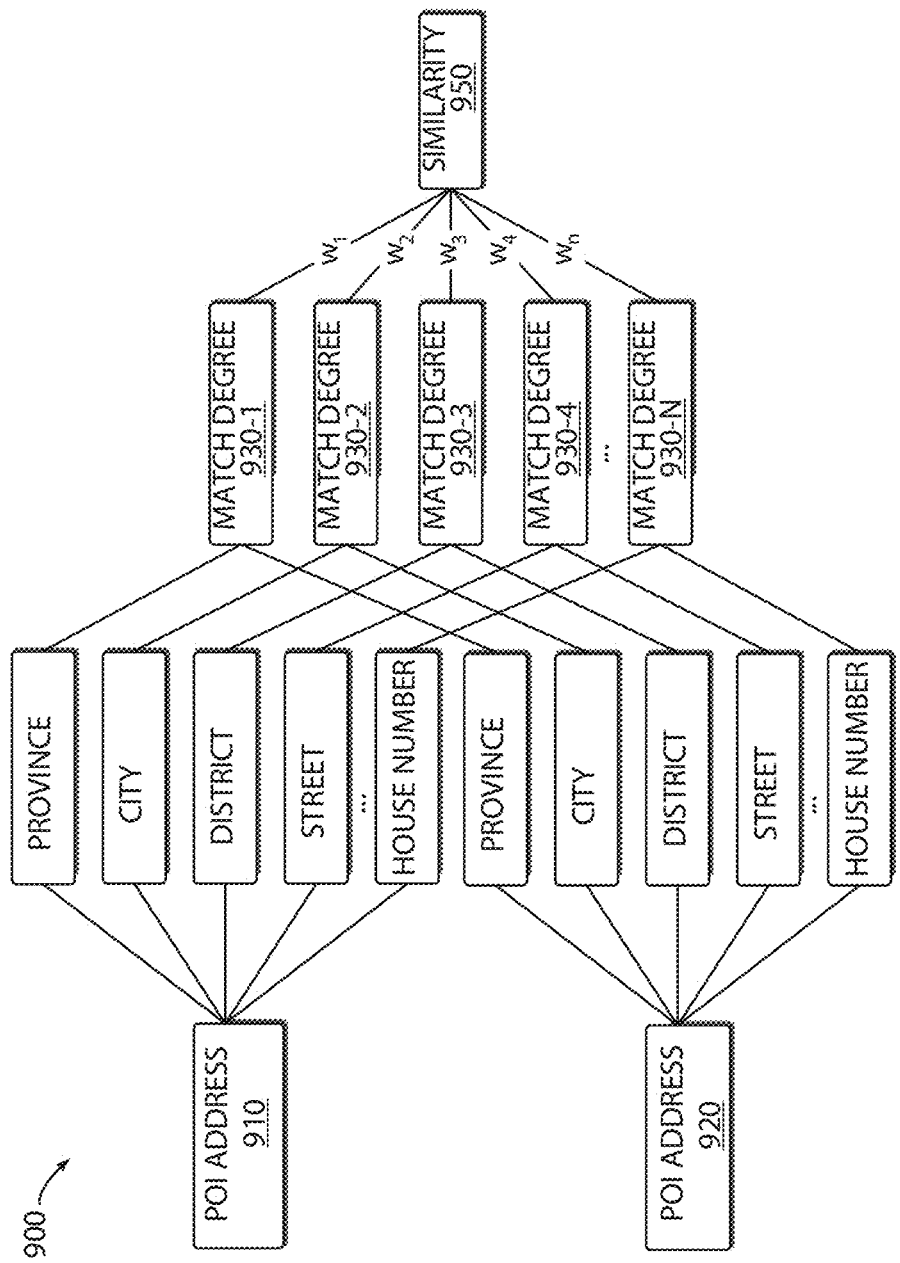
FIG. 9 depicts an example diagram for determining a similarity between two POI addresses according to embodiments of the present invention.

FIG. 9 depicts an example diagram 900 for determining a similarity between two POI addresses according to some embodiments of the present invention. Two POI addresses 910 and 920 are shown in FIG. 9, each of which may be represented as a text string. In some embodiments, the deduplication processing system 530 may preform segmentation on the text string 910 to determine a group of semantic units included in the text string 910, such as province, city, district, street, . . . and house number as shown in FIG. 9. Likewise, the deduplication processing system 530 may also perform segmentation on the text string 920 to determine a same group of semantic units included in the text string 920. In some cases, the semantic units included in the text string 910 and those included in the text string 920 may be different. For example, the district may be absent in the text string 910, while the city may be absent in the text string 920. In this case, the deduplication processing system 530 may attempt to infer the absent semantic units. For example, according to the street and the house number included in the text string 910, the deduplication processing system 530 may infer the district indicated by the POI address 910. According to the district and the street included in the text string 920, the deduplication processing system 530 may infer the city indicated by the POI address 920.

In some embodiments, the deduplication processing system 530 may determine a group of match degrees 930-1, 930-2 . . . 930-N (collectively referred to as match degrees 930) by comparing the semantic units of the POI address 910 and those of the POI address 920. Then, the deduplication process system 530 may determine a similarity 950 between the POI address 910 and the POI address 920 by weighting the match degrees 930 as the following equation (1):

$$S = \sum_{k=0}^{n} (w_k \cdot m_k)/n \quad (1)$$

where S represent the similarity 950, n represents the total number of match degrees 930, k represents an index of summation, $m_k$ represents the match degree 930-k and $w_k$ represent a weight to be applied to the match degree 930-k.

In this way, the deduplication processing system 530 can determine similarities between the first group of POIs and the second group of POIs with respect to different features. Additionally, in some embodiments, the deduplication process system 530 may utilize matrices to record the determined similarities.

Figure 10:
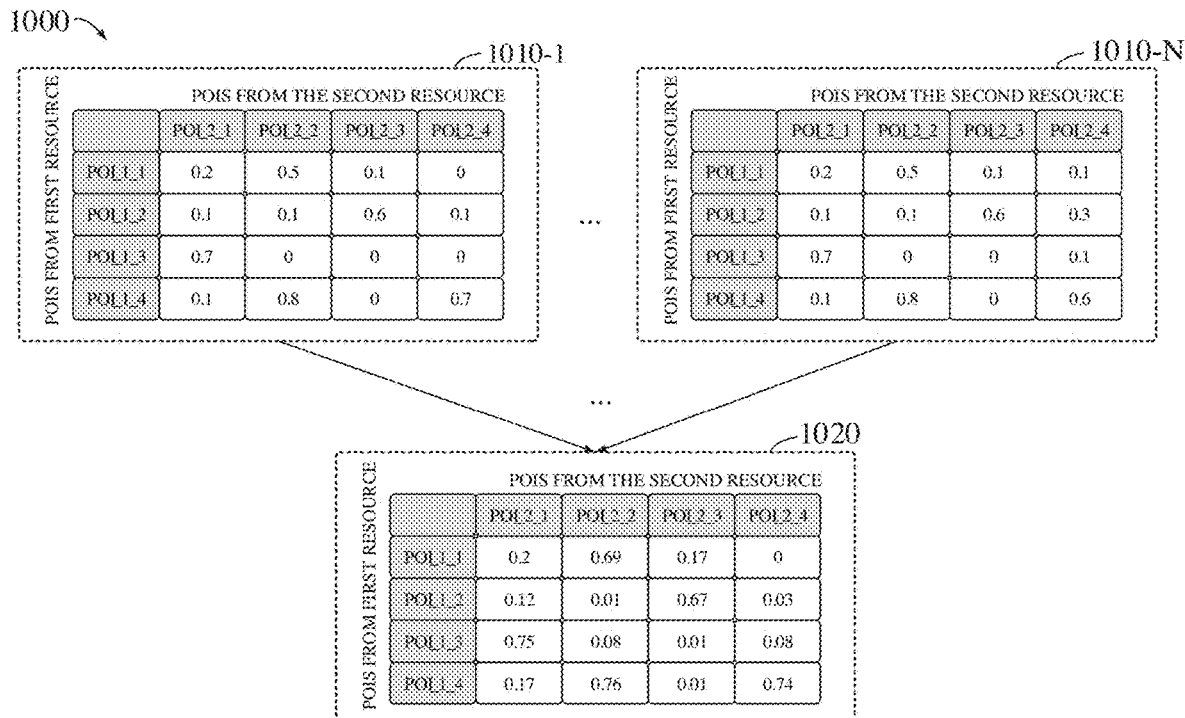
FIG. 10 depicts an example diagram of matrices for recording the determined similarities according to embodiments of the present invention.

FIG. 10 depicts an example diagram of matrices for recording the determined similarities according to some embodiments of the present invention. Only for the purpose of illustration, in FIG. 10, it is assumed that the first group of POIs from the first source include 4 POIs, which are represented as POI_1_1, POI_1_2, POI_1_3 and POI_1_4; while the second group of POIs from the second source include 4 POIs, which are represented as POI_2_1, POI_2_2, POI_2_3 and POI_2_4. A plurality of matrices 1010-1 to 1010-N (collectively referred to as matrices 1010, where N is a natural number) are shown in FIG. 10, each of which may record similarities between the first group of POIs and the second group of POIs with respect to one feature.

In some embodiments, the deduplication processing system 530 may further determine total similarities between the first group of POIs and the second group of POIs based on the matrices 1010. For example, the deduplication processing system 530 may determine a matrix 1020 by weighting the matrices 1010 as the following equation (2):

$$M = \sum_{i=0}^{n} (W_i \cdot N_i) \quad (2)$$

where M represents the matrix 1020, i represents an index of summation, n represents the total number of matrices, $N_i$ represents the matrix 1010-i and $W_i$ represents a weight to be applied to the matrix 1010-i. The matrix 1020 can indicate the total similarities between the first group of POIs and the second group of POIs, which can be used by the deduplication process system 530 to identify duplicated POIs from the first and second groups of POIs.

Figure 11:
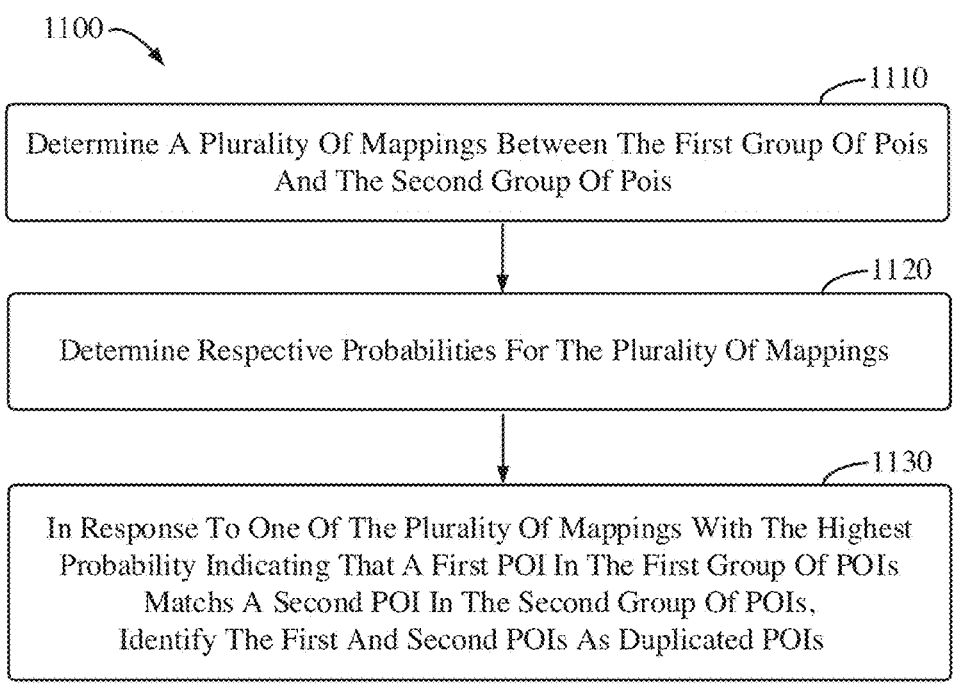
FIG. 11 depicts an example flowchart of a method for identifying duplicated POIs according to embodiments of the present invention.

FIG. 11 depicts an example flowchart of a method 1100 for identifying duplicated POIs according to some embodiments of the present invention. The method 1100 can be considered as an example implementation of block 640 shown in FIG. 6. For example, the method 1100 may be performed by the deduplication processing system 530. It is to be understood that the method 1100 may include additional blocks not shown and/or may omit some blocks as shown, and the scope of the present invention is not limited in this regard.

At block 1110, the deduplication processing system 530 determines a plurality of mappings between the first group of POIs and the second group of POIs. In some embodiments, one of the plurality of mappings may indicate a matching relationship between the first group of POIs and the second group of POIs. For example, the deduplication processing system 530 may determine the plurality of mappings based on various permutations of the first group of POIs and the second group of POIs.

At block 1120, the deduplication processing system 530 determines respective probabilities for the plurality of mappings. In some embodiments, the deduplication processing system 530 may determine the probabilities for the plurality of mappings based on the determined total similarities between the first group of POIs and the second group of POIs as described above. Hereafter, reference will be made to FIG. 12 to explain details about how to determine the probabilities for the plurality of mappings.

FIG. 12 depicts an example diagram 1200 of the plurality of mappings between the first group of POIs and the second group of POIs and their probabilities according to embodiments of the present disclosure. In the example as shown in FIG. 12, it is also assumed that the first group of POIs from the first source include 4 POIs, which are represented as POI_1_1, POI_1_2, POI_1_3 and POI_1_4, and the second group of POIs from the second source include 4 POIs, which are represented as POI_2_1, POI_2_2, POI_2_3 and POI_2_4. A plurality of mappings 1210-1, 1210-2 . . . 1210-10 (collectively referred to as mappings 1210) between the first group of POIs and the second group of POIs are determined and shown in FIG. 12. Each of the mappings 1210 may indicate a matching relationship between the first group of POIs and the second POIs.

For example, as shown in FIG. 12, the mapping 1210-1 may indicate the following matching relationship: POI_1_1 matching POI_2_1 (represented as "POI_1_1=POI_2_1"), POI_1_2 matching POI_2_2, POI_1_3 matching POI_2_3, and POI_1_4 matching POI_2_4. In some embodiments, the probability for the mapping 1210-1 can be determined based on the matrix 1020 shown in FIG. 10. For example, the probability for the mapping 1210-1 can be represented as a sum of a similarity between POI_1_1 and POI_2_1 (that is, "0.2"), a similarity between POI_1_2 and POI_2_2 (that is, "0.01"), a similarity between POI_1_3 and POI_2_3 (that is, "0.01") and a similarity between POI_1_4 and POI_2_4 (that is, "0.74"). That is, the probability for the mapping 1210-1 can be determined as 0.96. In this way, respective probabilities of the plurality of mappings can be determined as shown in FIG. 12.

With reference back to FIG. 11, the method 1100 proceeds to block 1130. At block 1130, in response to one of the plurality of mappings with the highest probability indicating that a first POI in the first group of POIs matches a second POI in the second group of POIs, the deduplication processing system 530 may identify the first POI and the second POI as duplicated POIs.

In the example as shown in FIG. 12, it can be seen that, the mapping 1210-9 is associated with the highest probability among the plurality of mappings 1210. The mapping 1210-9 indicates the following matching relationship: POI_1_1 matching POI_2_2, POI_1_2 matching POI_2_3, POI_1_3 matching POI_2_1, and POI_1_4 matching POI_2_4. For example, in this case, the deduplication processing system 530 may identify POI_1_1 and POI_2_2 as duplicated POIs, identify POI_1_2 and POI_2_3 as duplicated POIs, identify POI_1_3 and POI_2_1 as duplicated POIs and identify POI_1_4 and POI_2_4 as duplicated POIs.

In some cases, one POI from the second set of POIs may be identified as a duplicate of more than one POIs from the first set of POIs. For example, as shown in FIG. 7, the deduplication processing system 530 may identify the POIs 420-5 and 410-1 as duplicated POIs by matching the POIs 420-1, 420-2, 420-3 and 420-5 with the POI 410-1. In addition, the deduplication processing system 530 may identify the POIs 420-5 and 410-2 as duplicated POIs by matching the POIs 420-4 and 420-5 with the POI 410-2. In some embodiments, in this event, the deduplication processing system 530 may further compare the similarity between the POI 420-5 and the POI 410-1 and the similarity between the POI 420-5 and the POI 410-2 (such as, based on the similarity matrices), so as to determine whether the POI 420-5 is a duplicate of the POI 410-1 or a duplicate of the 410-2. If the similarity between the POI 420-5 and the POI 410-1 exceeds the similarity between the POI 420-5 and the POI 410-2, the POI 420-5 will be considered as a duplicate of the POI 410-1 instead of the POI 410-2.

With reference back to FIG. 6, the method 600 proceeds to block 650. At block 650, in response to a first node in the first set of POIs and a second node in the second set of POIs being identified as duplicated POIs, the deduplication processing system 530 merges the first set of POIs and the second set of POIs into the third set of POIs by causing the third set of POIs to include one of the first and second POIs.

In some embodiments, the first source may be a specialized POI provider, which may provide POIs with relatively high precision. The second source may be a common POI provider, which may provide POIs with relatively low precision. In this event, if it is determined that the first POI and the second POI are duplicated POIs, the deduplication processing system 530 may cause the third set of POIs to include the first POI originating from the first source, while excluding the second POI originating from the second source.

Figure 13:
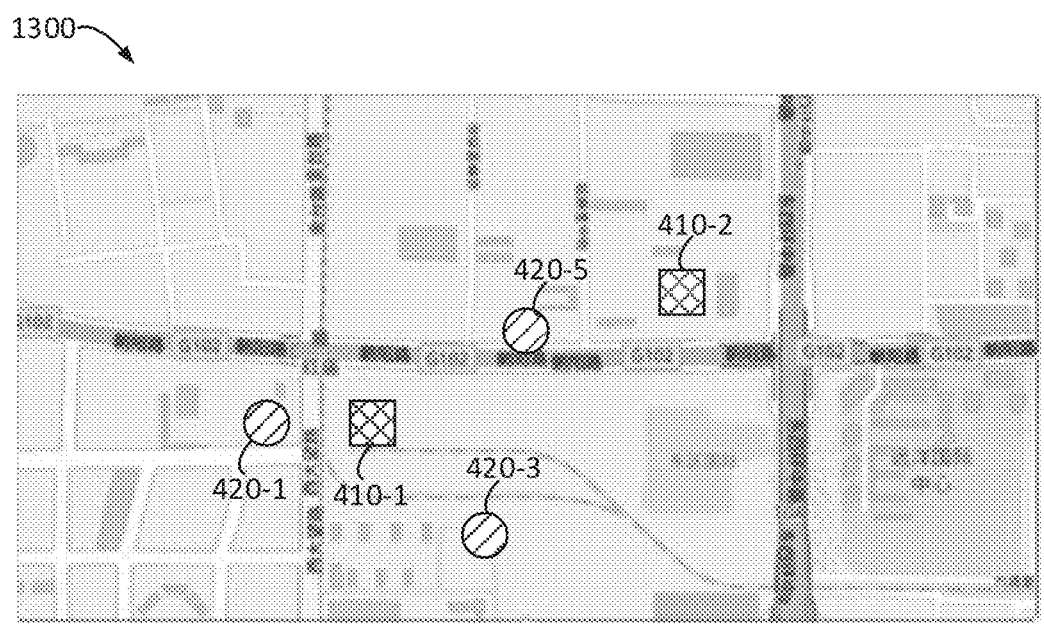
FIG. 13 depicts an example diagram of a result of POI deduplication according to embodiments of the present invention.

For example, as shown in FIG. 7, the deduplication processing system 530 may match the POIs 420-1, 420-2, 420-3 and 420-5 with the POI 410-1 to determine duplicated POIs. If it is determined that one of the POIs 420-1, 420-2, 420-3 and 420-5 (for example, the POI 420-2) matches the POI 410-1, the deduplication processing system 530 may identify the POIs 420-2 and 410-1 as duplicated POIs. Likewise, the deduplication processing system 530 may match the POIs 420-4 and 420-5 with the POI 410-2 to determine duplicated POIs. If it is determined that one of the POIs 420-4 and 420-5 (for example, the POI 420-4) matches the POI 410-2, the deduplication processing system 530 may identify the POIs 420-4 and 410-2 as duplicated POIs. Then, the deduplication processing system 530 may cause the third set of POIs 540 to include the POIs 410-1, 410-2, 420-1, 420-3 and 420-5, and exclude the POIs 420-2 and 420-4. An example diagram of the deduplication result may be shown in FIG. 13.

It can be seen from the above descriptions that, embodiments of the present invention provide a new solution for deduplicating POIs from different sources. The solution splits the global POI matching between different sources into multiple parallel groups, so as to narrow the search space for duplicated POIs. In this way, the solution can greatly improve the efficiency of POI deduplication, and reduce the computing overhead thereof.

It should be noted that the processing of POI deduplication (or achieved by the deduplication processing system 530) according to embodiments of this invention could be implemented by computer system/server 12 of FIG. 1.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
    obtaining, by one or more processors, a first set of points of interest (POIs) from a first source and a second set of POIs from a second source;
    dividing, by the one or more processors, the first set of POIs into a plurality of groups of POIs, the plurality of groups of POIs including a first group of POIs;
    determining, by the one or more processors and from the second set of POIs, a second group of POIs to be matched with the first group of POIs;
    determining, by the one or more processors, respective probabilities between POIs of the first group of POIs and the second group of POIs; and
    identifying, by the one or more processors, duplicated POIs from the first and second sets of POIs by identifying a highest probability indicating that a first POI in the first group of POIs matches a second POI in the second group of POIs.

2. The method of claim 1, further comprising: in response to a first POI in the first set of POIs and a second POI in the second set of POIs being identified as duplicated POIs, merging the first set of POIs and the second set of POIs into a third set of POIs, such that the third set of POIs include one of the first and second POIs.

3. The method of claim 1, wherein dividing the first set of POIs into the plurality of groups of POIs comprises:
    determining, by the one or more processors, a geographic area where the first set of POIs are located;

dividing, by the one or more processors, the geographic area into a plurality of sub-areas based on at least one of the following: a distribution of the first set of POIs in the geographic area, types of the first set of POIs, or a predetermined sub-area size; and selecting, by the one or more processors, a POI located in one of the plurality of sub-areas into one of the plurality of groups of POIs.

4. The method of claim 3, wherein determining the second group of POIs comprises:

in response to the first group of POIs being located in a first sub-area from the plurality of sub-areas, determining, by the one or more processors, a distance from a third POI in the second set of POIs to the first sub-area; and in response to the distance being below a predetermined threshold, selecting, by the one or more processors, the third POI into the second group of POIs.

5. The method of claim 1, further comprising:

determining, by the one or more processors, a plurality of mappings between the first group of POIs and the second group of POIs, wherein the respective probabilities are determined for the plurality of mappings; and identifying the first and second POIs as duplicated POIs is in response to one of the plurality of mappings having the highest probability.

6. The method of claim 5, wherein determining respective probabilities for the plurality of mappings comprises:

determining, by the one or more processors, similarities between the first group of POIs and the second group of POIs; and determining, by the one or more processors and based on the similarities, a probability for one of the plurality of mappings.

7. The method of claim 6, wherein determining similarities between the first group of POIs and the second group of POIs comprises:

determining, by the one or more processors, a first similarity between a first feature of a fourth POI in the first group of POIs and the first feature of a fifth POI in the second group of POIs;

determining, by the one or more processors, a second similarity between a second feature of the fourth POI and the second feature of the fifth POI; and determining, by the one or more processors, a similarity between the fourth POI and the fifth POI by weighting the first similarity and the second similarity.

8. The method of claim 7, wherein each of the first feature and the second feature includes one of a spatial feature and a text feature.

9. The method of claim 2, wherein merging the first set of POIs and the second set of POIs into the third set of POIs comprises:

comparing, by the one or more processors, first data quality of the first source and second data quality of the second source; and in response to the first data quality exceeding the second data quality, causing, by the one or more processors, the third set of POIs to include the first POI while excluding the second POI.

10. A system comprising:

a processing unit; and a memory coupled to the processing unit and storing instructions thereon, the instructions, when executed by the processing unit, perform actions comprising:

obtaining a first set of points of interest (POIs) from a first source and a second set of POIs from a second source;

dividing the first set of POIs into a plurality of groups of POIs, the plurality of groups of POIs including a first group of POIs;

determining, from the second set of POIs, a second group of POIs to be matched with the first group of POIs;

determining respective probabilities between POIs of the first group of POIs and the second group of POIs; and identifying duplicated POIs from the first and second sets of POIs by identifying a highest probability indicating that a first POI in the first group of POIs matches a second POI in the second group of POIs.

11. The system of claim 10, wherein the actions further comprise: in response to a first POI in the first set of POIs and a second POI in the second set of POIs being identified as duplicated POIs, merging the first set of POIs and the second set of POIs into a third set of POIs, such that the third set of POIs include one of the first and second POIs.

12. The system of claim 10, wherein dividing the first set of POIs into the plurality of groups of POIs comprises:

determining a geographic area where the first set of POIs are located;

dividing the geographic area into a plurality of sub-areas based on at least one of the following: a distribution of the first set of POIs in the geographic area, types of the first set of POIs, or a predetermined sub-area size; and selecting a POI located in one of the plurality of sub-areas into one of the plurality of groups of POIs.

13. The system of claim 12, wherein determining the second group of POIs comprises:

in response to the first group of POIs being located in a first sub-area from the plurality of sub-areas, determining a distance from a third POI in the second set of POIs to the first sub-area; and in response to the distance being below a predetermined threshold, selecting the third POI into the second group of POIs.

14. The system of claim 10, further comprising:

determining a plurality of mappings between the first group of POIs and the second group of POIs, wherein the respective probabilities are determined for the plurality of mappings; and identifying the first and second POIs as duplicated POIs is in response to one of the plurality of mappings having the highest probability.

15. The system of claim 14, wherein determining respective probabilities for the plurality of mappings comprises:

determining similarities between the first group of POIs and the second group of POIs; and determining, based on the similarities, a probability for one of the plurality of mappings.

16. The system of claim 15, wherein determining similarities between the first group of POIs and the second group of POIs comprises:

determining a first similarity between a first feature of a fourth POI in the first group of POIs and the first feature of a fifth POI in the second group of POIs;

determining a second similarity between a second feature of the fourth POI and the second feature of the fifth POI; and determining a similarity between the fourth POI and the fifth POI by weighting the first similarity and the second similarity.

17. The system of claim 16, wherein each of the first feature and the second feature includes one of a spatial feature and a text feature.

18. The system of claim 11, wherein merging the first set of POIs and the second set of POIs into the third set of POIs comprises:

comparing first data quality of the first source and second data quality of the second source; and in response to the first data quality exceeding the second data quality, causing the third set of POIs to include the first POI while excluding the second POI.

19. A computer program product being tangibly stored on a non-transient machine-readable medium and comprising machine-executable instructions, the instruction, when executed on a device, causing the device to perform acts comprising:

obtaining a first set of points of interest (POIs) from a first source and a second set of POIs from a second source;

dividing the first set of POIs into a plurality of groups of POIs, the plurality of groups of POIs including a first group of POIs;

determining, from the second set of POIs, a second group of POIs to be matched with the first group of POIs;

determining, by the one or more processors, respective probabilities between POIs of the first group of POIs and the second group of POIs; and identifying duplicated POIs from the first and second sets of POIs by identifying a highest probability indicating that a first POI in the first group of POIs matches a second POI in the second group of POIs.

20. The computer program product of claim 19, wherein the actions further comprise:

in response to a first POI in the first set of POIs and a second POI in the second set of POIs being identified as duplicated POIs, merging the first set of POIs and the second set of POIs into a third set of POIs, such that the third set of POIs include one of the first and second POIs.

\* \* \* \* \*